(12) United States Patent
Krieger et al.

(10) Patent No.: US 6,181,662 B1
(45) Date of Patent: Jan. 30, 2001

(54) LATENT IRRADIANCE DISCRIMINATION METHOD AND MARKER SYSTEM FOR CARTRIDGELESS DATA STORAGE DISKS

(75) Inventors: George T. Krieger, Carmel, CA (US); Fred C. Thomas, III, Ogden, UT (US)

(73) Assignee: Iomega Corporation, Roy, UT (US)

( * ) Notice: Under 35 U.S.C. 154(b), the term of this patent shall be extended for 0 days.

(21) Appl. No.: 09/160,811

(22) Filed: Sep. 25, 1998

Related U.S. Application Data

(63) Continuation-in-part of application No. 08/936,970, filed on Sep. 26, 1997, now Pat. No. 6,091,563.

(51) Int. Cl.[7] ............................. G11B 31/00; G11B 3/70; G11B 5/82

(52) U.S. Cl. ............................. 369/70; 369/69; 369/273; 360/135

(58) Field of Search ............................. 369/70, 69, 273, 369/283, 284; 360/135

(56) References Cited

U.S. PATENT DOCUMENTS

| 3,207,910 | 9/1965 | Hirschfeld et al. .................. 250/226 |
| 3,412,245 | 11/1968 | Halverson .............................. 250/71 |
| 3,444,517 | 5/1969 | Rabinow ............................ 340/146.3 |

(List continued on next page.)

FOREIGN PATENT DOCUMENTS

| 2135059 | 1/1973 | (DE) . |
| 29 15 423 A1 | 10/1979 | (DE) . |
| 41 24 833 C2 | 9/1993 | (DE) . |
| 29 60 7070 U | 8/1996 | (DE) . |

(List continued on next page.)

OTHER PUBLICATIONS

Ryer, A., *Light Measurement Handbook*, Index, http://www.intl–light.com/handbook, 1997–1998, 3 pages.

Ryer, A., "The Power of Light", *Light Measurement Handbook*, http://www.intl–light.com/handbook/ch02.html, 1997–1998, 4 pages.

Ryer, A., "Measurement Geometries", *Light Measurement Handbook*, http://www.intl–light.com/handbook/ch07.html, 1997–1998, 10 pages.

Internet pages regarding "irradiation", 1 page; "irradiance", 1 page; "radiant power", 1 page; "radiant energy", 1 page; "time", 1 page; "time scale", 1 page; and "Spectral Irradiance", 1 page.

Saleh, B.E. et al., *Fundamentals of Photonics*, John Wiley & Sons, Inc., 454–457.

Kuchling, H., *Taschenbuch der Physik*, Verelag Harri Deutsch, 1979, 363–364.

Patent Abstracts of Japan, vol. 18(85), published Feb. 1994, Appl'n No. 4–113,999, Sugarawa.

Jacobs, S.f., "Experiments with retrodirective arrays", *Optical Engineering*, 1982, 21(2), 281–283.

Rennilson, J. "Retroreflection–What is it and how is it used?", *ASTM Standardization News*, Feb. 1982, 3 pages.

Venable, Jr. et al., "Factors affecting the metrology of retroreflecting materials", *Applied Optics*, 1980, 19(8), 1242–1246.

(List continued on next page.)

*Primary Examiner*—William Klimowicz
(74) *Attorney, Agent, or Firm*—Woodcock Washburn Kurtz Mackiewicz & Norris LLP

(57) ABSTRACT

A cartridgeless data storage disk for a data storage disk drive has a latent irradiance marker. A light source illuminates the marker and the marker emits irradiance as phosphorescence. A photosensor detects the emitted irradiance, and the decay time is determined. The decay time is checked to provide identification of different types or generations of cartridgeless data storage disks.

54 Claims, 9 Drawing Sheets

U.S. PATENT DOCUMENTS

| | | | |
|---|---|---|---|
| 3,468,046 | 9/1969 | Makishima | 40/2.2 |
| 3,473,027 | 10/1969 | Freeman et al. | 250/71 |
| 3,483,388 | 12/1969 | Ogle et al. | 250/219 |
| 3,513,320 | 5/1970 | Weldon | 250/219 |
| 3,522,432 | 8/1970 | Ortlieb | 250/71 |
| 3,614,430 | 10/1971 | Berler | 250/71 R |
| 3,654,463 | 4/1972 | Geusic et al. | 250/71 R |
| 3,718,078 | 2/1973 | Plummer | 359/742 |
| 3,738,299 | 6/1973 | Packler et al. | 112/439 |
| 3,760,161 | 9/1973 | Lohne et al. | 235/61.11 E |
| 3,830,682 | 8/1974 | Rowland | 161/2 |
| 3,894,164 | 7/1975 | Dismukes et al. | 427/70 |
| 4,019,060 | 4/1977 | Woodman | 250/461 R |
| 4,047,033 | 9/1977 | Malmberg et al. | 250/341 |
| 4,058,732 | 11/1977 | Wieder | 250/461 B |
| 4,146,792 | 3/1979 | Stenzel et al. | 250/365 |
| 4,211,813 | 7/1980 | Gravisse et al. | 428/263 |
| 4,297,584 | 10/1981 | Buchanan et al. | 250/483 |
| 4,374,328 | 2/1983 | Tekippe et al. | 250/458.1 |
| 4,442,170 | 4/1984 | Kaule et al. | 428/333 |
| 4,451,521 | 5/1984 | Kaule et al. | 428/199 |
| 4,485,308 | 11/1984 | Rabatin | 250/461.1 |
| 4,533,244 | 8/1985 | Kaule et al. | 356/71 |
| 4,571,085 | 2/1986 | Anderson | 356/445 |
| 4,633,451 | 12/1986 | Ahn et al. | 369/14 |
| 4,650,320 | 3/1987 | Chapman et al. | 356/71 |
| 4,791,310 | 12/1988 | Honig et al. | 250/458.1 |
| 4,839,092 | 6/1989 | Lindmayer | 252/301.4 S |
| 4,866,694 | 9/1989 | Korth | 369/110 |
| 4,908,516 | 3/1990 | West | 250/356 |
| 4,915,982 | 4/1990 | Lindmayer | 427/69 |
| 5,029,034 | 7/1991 | Weiley | 360/132 |
| 5,038,359 | 8/1991 | Pepper et al. | 359/529 |
| 5,042,020 | 8/1991 | Endo | 369/44.31 |
| 5,210,411 | 5/1993 | Oshima et al. | 250/271 |
| 5,220,166 | 6/1993 | Takeuchi et al. | 250/271 |
| 5,270,854 | 12/1993 | Lee et al. | 359/359 |
| 5,289,451 | 2/1994 | Ashinuma et al. | 369/58 |
| 5,325,243 | 6/1994 | Rath et al. | 360/71 |
| 5,329,127 | 7/1994 | Becker et al. | 250/459.1 |
| 5,351,268 | 9/1994 | Jensen et al. | 374/131 |
| 5,414,266 | 5/1995 | Sun | 250/459.1 |
| 5,463,212 | 10/1995 | Oshima et al. | 235/468 |
| 5,471,281 | 11/1995 | Hayashi et al. | 155/201 |
| 5,491,586 | 2/1996 | Phillips | 359/529 |
| 5,495,466 | 2/1996 | Dohmeier et al. | 369/275.4 |
| 5,525,798 | 6/1996 | Berson et al. | 250/271 |
| 5,548,106 | 8/1996 | Liang et al. | 235/454 |
| 5,576,110 | 11/1996 | Lin et al. | 428/447 |
| 5,604,006 | 2/1997 | Ponchaud et al. | 428/67 |
| 5,608,225 | 3/1997 | Kamimura et al. | 250/458.1 |
| 5,611,958 | 3/1997 | Takeuchi et al. | 252/301.4 P |
| 5,638,228 | 6/1997 | Thomas, III | 360/60 |
| 5,668,363 | 9/1997 | Nishida et al. | 235/468 |
| 5,745,460 | 4/1998 | Tateishi | 369/58 |
| 5,745,461 | 4/1998 | Kawasaki | 369/58 |
| 5,790,489 | 8/1998 | O'Connor | 369/52 |
| 6,091,563 * | 7/2000 | Thomas, III et al. | 360/69 |

FOREIGN PATENT DOCUMENTS

| | | |
|---|---|---|
| 195 25 677 C1 | 12/1996 | (DE) . |
| 0 532 997 A1 | 3/1993 | (EP) . |
| 0 716 102 A1 | 6/1996 | (EP) . |
| 0 802 499 A2 | 10/1997 | (EP) . |
| 1 232 570 | 5/1971 | (GB) . |
| 2018984 | 10/1979 | (GB) . |
| 62-76061 | 4/1987 | (JP) . |
| 2-084640 * | 3/1990 | (JP) . |
| 4-61650 | 2/1992 | (JP) . |
| 4-167286 | 6/1992 | (JP) . |
| 5-225572 * | 9/1993 | (JP) . |
| 6-18540 | 6/1994 | (JP) . |
| 8-124239 * | 5/1996 | (JP) . |
| 10-208301 * | 8/1998 | (JP) . |
| 11-124815 * | 9/1999 | (JP) . |
| WO 95/19605 | 7/1995 | (WO) . |
| WO 97/10307 | 3/1997 | (WO) . |
| WO 98/29238 | 7/1998 | (WO) . |

OTHER PUBLICATIONS

Walker, J. "The Amateur Scientist: Wonders with the retroreflector, a mirror that removes distortion from a light beam", *Scientific American*, 1988, 258(1), 118–123.

Reflexite Corporation Brochure NA1010, "Reflectors for Photoelectric Controls", Apr. 1993, 4 pages.

Lerner, J.S., Shie, R., Petersen, J., "Holographic Light Shaping Diffusers", presented at The Aerospace Lighting Institute, Advanced Seminar, Feb. 1994, Los Angeles, CA, 4 pages.

Physical Optics Corporation Brochure JL1–493, "Light Shaping Diffusers", 2 pages.

The Optometrics Group Catalog, "Optical Components & Instruments Catalog—Gratings", 1996, 28–35.

Kathman, A. et al., "Binary Optics: New Diffractive Elements for the Designer's Tool Kit", The Photonics Design & Applications Handbook®, Laurin Publishing Co., Inc., 1994 (Book 3), H358–360.

Loewen, E.G., "Diffraction Gratings: Selection of Size and Type for Different Applications", The Photonics Design & Applications Handbook®, Laurin Publishing Co., Inc., 1994 (Book 3), H362–H365.

Faklis, D., et al., "Optical Design/Diffractive Lenses: Taking Advantage of Diffractive Optics to Reduce Size, Weight and Cost", The Photonics Design & Applications Handbook®, Laurin Publishing Co., Inc., 1994 (Book 3), H386–H390.

U.S. application No. 08/746,085, Edwards et al., filed Nov. 1996.

* cited by examiner

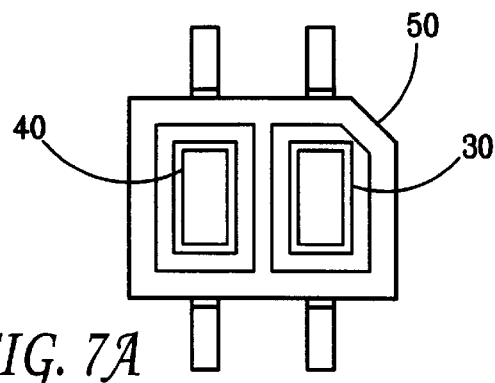
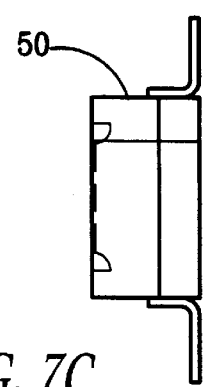
FIG. 7A    FIG. 7C
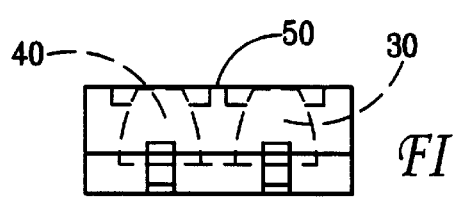
FIG. 7B
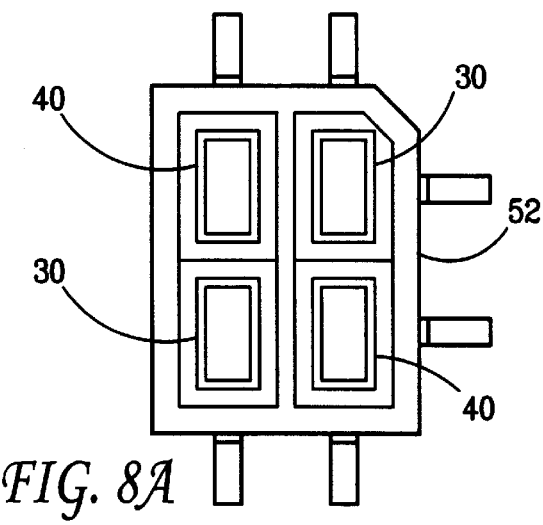
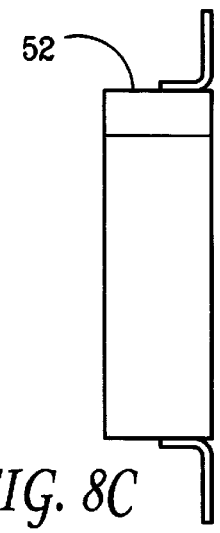
FIG. 8A    FIG. 8C
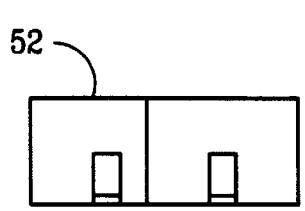
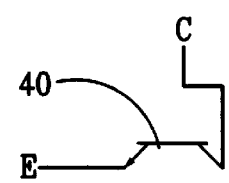
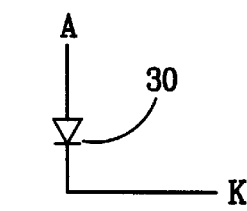
FIG. 8B
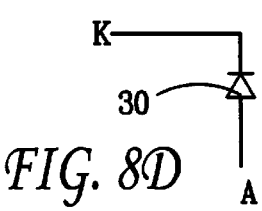
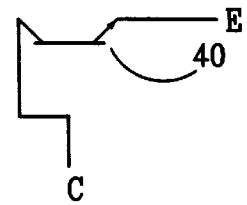
FIG. 8D

LATENT IRRADIANCE DISCRIMINATION METHOD AND MARKER SYSTEM FOR CARTRIDGELESS DATA STORAGE DISKS

This application is a continuation-in-part application of Ser. No. 08/936,970, filed on Sep. 26, 1997, now U.S. Pat. No. 6,091,563.

FIELD OF THE INVENTION

The present invention relates in general to a marker for identifying a cartridgeless data storage disk in a system which includes a source of irradiance and a detector of light emitted from the marker. More particularly, the present invention relates to a cartridgeless data storage disk and a data storage drive for receiving the disk. Even more particularly, the present invention relates to detecting the presence of the correct cartridgeless disk in the data storage drive by use of a latent irradiance marker on the disk.

BACKGROUND OF THE INVENTION

The storage industry is continually faced with customer demands for ever-greater storage capacity. Customers and end users desire that these new and improved data storage disk products be compatible and interchangeable with existing drive systems. In addition, the entertainment business, such as the movie industry and computer game manufacturers, has a need to confirm the authenticity of the content holding medium and to determine the proper mode of operation of a particular drive based on the disk that is being used. Disk drives for receiving media such as removable data storage disks must have some mechanism for detecting the insertion or presence of a data storage disk in the drive. For some disk drive systems, it is desired that the actuator that carries the recording heads of the drive across the surface of the data storage disk not be allowed to move and engage the disk unless the disk is compatible with that drive. This is important in order to avoid damage to the drive and head assembly that may result from an incompatible disk. Due to the removability feature of the disks with various drive types, an opening is provided in the disk drive to allow for the insertion and removal of the data storage disks. This feature allows for the possibility of foreign objects or incompatible disk being inserted into the drive, which could result in damage to the drive. Also, the spindle motor of the drive may be inadvertently activated by the detection of a foreign object, thereby generating particle debris in the drive.

Prior cartridge type products, such as floppy disks, have used switches triggered by differences in the cartridge to determine disk type. These mechanical switches are typically employed to detect the presence of a data storage disk having a cartridge within the drive. For example, a 21 MB floptical disk has different locations and quantity of depressions in the lower portion of its cartridge as compared to a 2 MB floppy for use with the same disk drive system. The switches activated by the arrangement of depressions enable the proper drive elements for that cartridge to operate properly.

Prior cartridge type products have also used a retro-reflective marker to determine disk type. "RETRO-REFLECTIVE MARKER FOR DATA STORAGE CARTRIDGE", U.S. Pat. No. 5,638,228, to Thomas, III, describes the reflection of a highly concentrated quasi circular lobe of light whose spread on reflection is captured by the aperture of a phototransistor in close proximity to a light emitting diode (LED). This excitor/detector pair is in the drive and a retro-reflective array is on the cartridge. The desired light lobe size is provided by the geometric size of the retro-reflector array elements relative to the spacing of the excitor and the detector in the drive. Due to this physical size matching and the fact that retro-reflectors are used, this marker on the cartridge is quite insensitive to cartridge tilt and distance from the excitor/detector pair in the drive. Another problem associated with the detection of LED light reflected from any reflective material is the occurrence of illuminance hot spots or structure in the LED output which often results in uneven illumination of the cartridge marker. Reflective cartridge markers can also become faded, scratched, or soiled. These factors combine to make the amplitude of the detected light signal highly variable. This patent is incorporated herein by reference.

Recently, in various industries such as the distribution industry, phosphors have been used in the control of goods by means of bar codes, and furthermore, bar codes are printed on various prepaid cards and passing cards, and these bar codes are read by optical reading apparatuses such as scanners to perform the desired actions. Moreover, various attempts have been made to apply forgery preventive means to credit cards and prepaid cards or to detect forged cards. For example, the marks, such as bar codes, are printed with an ink containing a phosphor by offset printing or by using an ink ribbon to form latent image marks. The latent image marks are irradiated with a semiconductor laser beam to excite the phosphor and the light emitted from the phosphor is received to read the bar code information by an optical reading apparatus. These techniques use the spectral content of the latent irradiance for identification.

"LATENT ILLUMINANCE DISCRIMINATION MARKER FOR DATA STORAGE CARTRIDGES", filed concurrently with this application, Thomas III, et al. U.S. patent application Ser. No. 09/161,007, describes a system for identifying and discriminating removable data storage cartridges and a data storage drive for receiving the cartridge. This system relates to the detection of the correct disk cartridge in the data storage drive by use of the decay time of a latent illuminance tag, preferably a phosphor tag disposed on the cartridge.

However, many data storage products do not have a carrier or cartridge for the disk, including optical data storage products such as ROM CD, R/W CD, and Write Once CD. This creates a problem of limited detection and validation options because the above described cartridge based detection and validation mechanisms are no longer feasible. Thus, traditional cartridge type detection systems are not suitable for current removable disks, such as CD type media, because these systems generally do not use a cartridge or carrier for the disk. Accordingly, there is a need to differentiate various types of disks that have no cartridge or carrier, preferably using components of current disk drives.

The product designer is thus faced with the problem of determining which type of disk and data storage media is currently in the drive and how to handle it physically. These issues include for example, setting disk spin rate, laser write power, determining disk type, servo implementation for media, and error correction code implementation. There is also a need to insure that some types of disks, such as movies and computer games, are authentic copies. With the coming to market of several types of high density removable data storage products such as writable CD, DVD products, high density flexible magnetic storage, rigid magnetic platter cartridges, photo-magnetic disks, phase change disks, and write-once optical disks with organic dye, as well as optical disks and magnetic tape products, double sided disks composed of two thin-type single sided disks stuck back to back, and multi-layer optical disks, the likelihood of unlicensed replication and sale of content on data storage disks is at an all time high.

Recently, several methods have been used to discriminate cartridgeless type disks. For example, one conventional disk drive system can play both a laser disk and a compact disk. This system first determines the size of a disk placed on the turntable (the two disks have different sizes), and then plays the disk using the appropriate method according to the size of the disk. However, for reading disks that have the same size, this mechanical method of disk discrimination is difficult.

The problem of disk distinction where the drive is capable of reading disks of the same size has been addressed by focusing on different recording densities of each disk, such as the compact disk and digital video disk. "DISK DISCRIMINATING METHOD AND APPARATUS", U.S. Pat. No. 5,745,460, Tateishi et al., describes a disk discriminating method and a disk discriminating apparatus in a disk drive, which distinguishes between disks of different recording systems based on the different recording densities of each disk. While a disk is rotated by a constant number of rotations, a recorded signal is read from the disk to acquire a read signal, one of the maximum period, minimum period, maximum inversion interval, minimum inversion interval and average frequency of the read signal is detected, and the type of the disk is determined in accordance with the detected value. However, this discrimination system is limited to applications where disk densities are readily distinguishable and require activation and engagement of the drive and head assembly.

Another method for optically discriminating types of disks having the same size is described in Japanese Patent Application Laid Open as a Provisional Publication No. 76061/87, which describes a reproduction unit using automatic discrimination for both the ordinary CD and the write-once CD having different reflectivities. A signal level obtained from an optical head is measured for determining a disk type when an object lens is approaching near focal point in a focus searching operation. However, currently available and proposed optical disks have a very high density in order to carry a huge amount of data, such as digital video data. Due to these very high density disks, this method is not adequate to reliably discriminate between different types of disks based only on their reflectivity.

"METHOD AND A SYSTEM OF OPTICAL DISK AUTO-DISCRIMINATING", U.S. Pat. No. 5,745,461, Kawasaki, et al., attempts to solve this problem by providing a method and system of automatic discrimination of types of optical disks according to differences in their recording density, number and material of their recording layer, and their disk thickness, i.e., either single sided or double sided. This method has difficulties in distinguishing disks having relatively similar densities, and requires numerous parameters be monitored and evaluated to correctly determine the type of disk in the drive.

The ability to discriminate between disk types after insertion into a data storage device but prior to engaging the read/write heads or other disk drive components is of significant value and utility. Principally this utility comes from the ability to detect the difference between various capacities or generations of data storage disks in a downward media compatible data storage drive. This discrimination capability allows for drive/media specific adjustments to be made, such as disk rotation rate, data channel rates, location of Z track for initial seeking, and mechanical adjustment in the drive like the active engagement of new crash stop locations. The ability of a disk drive to predetermine the type/generation of data storage disk inserted into it prior to enabling the spin-up and engagement of read/write elements also provides the drive system designer with new possibilities for cross-platform interchangeability.

Some means to authenticate the true licensed content holding disk is of significant value to prevent damage or destruction of drive systems and to protect a copyright holder's interest. A reliable device of automatic discrimination applicable for these various types of optical disks is desired. It is also desirable to use the existing drive components in a drive system for detecting and validating the data storage disk.

Although the art of detecting and discriminating between data storage disks is well developed, there remain some problems inherent in this technology, particularly when the disk is cartridgeless. Therefore, a need exists for a marker that produces reliable detection and discrimination between cartridgeless data storage disks.

SUMMARY OF THE INVENTION

The present invention is directed to a cartridgeless data storage disk for a data storage drive which has a source of irradiance at an irradiance wavelength and a detector of irradiance for determining whether the data storage disk is suitable for use in the drive, comprising: a body; a data storage media on the body; and a marker disposed on the body. The marker comprises a latent irradiance material which receives irradiance from the source and emits irradiance having an initial intensity value toward the detector for detection, which thereby identifies the data storage disk as being suitable for use in that drive. Preferably, the body comprises a read only memory (ROM) compact disk (CD), a read/write (R/W) CD, a write once CD, an optical data storage device, a video data storage device, an audio data storage device, or a digital versatile disk data storage device. Preferably, the marker has a latent illuminance wavelength spectrum in the range between about 450 nm and about 1050 nm, and more preferably, between about 680 nm and about 800 nm.

According to further aspects of the present invention, the irradiance wavelength is outside of the latent illuminance wavelength spectrum, and the phosphorescent material comprises a rare earth phosphor and/or a Stokes phosphor.

According to further aspects of the present invention, the latent illuminance material has a decay time which is used to identify the cartridgeless data storage disk. The decay time preferably is in the range between about 50 μsec and about 3,000 μsec. The decay time is an amount of time for the irradiance from the marker to decay from a first predetermined intensity value to a second predetermined intensity value.

According to a further aspect of the present invention, the irradiance from the marker has an intensity that decays exponentially.

According to further aspects of the present invention, the marker further comprises a filter to absorb light having a predetermined range of wavelengths. Preferably the filter comprises a rare earth element, such as ytterbium.

Another embodiment within the scope of this invention includes a cartridgeless data storage disk for a data storage drive which has a source of irradiance at an irradiance wavelength and a detector of irradiance for determining whether the data storage disk is suitable for use in the drive, comprising: a body; a data storage medium on the body; and a marker on the body. The marker comprises a material which receives irradiance from the source at the irradiance wavelength and emits irradiance at an emission wavelength different from the irradiance wavelength toward the detector for detection which thereby identifies the data storage disk as being suitable for use in that drive. According to one aspect of the present invention, the emission wavelength is greater than the irradiance wavelength.

Another embodiment within the scope of this invention is directed to a cartridgeless data storage disk drive comprising: a source of irradiance; a detector of irradiance; and means for enabling the drive. The detector is connected to enable the means for enabling the drive when the detected irradiance indicates a predetermined decay time. Preferably, the source of irradiance is a laser that is a read/write laser. According to one aspect of the present invention, the detector is a photodiode, a phototransistor, a photosensor, a light receptor, or a photodetector.

Another embodiment within the scope of this invention is directed to a combination of a cartridgeless data storage disk drive and an cartridgeless disk for the drive, the drive comprising: a source of irradiance at an irradiance wavelength; a detector of irradiance; and means for enabling the drive. The cartridgeless disk comprises a body; a data storage medium on the body; and a marker on the body. The marker is a latent irradiance material which receives irradiance from the source and emits irradiance toward the detector for detection. The detector is connected to enable the means for enabling the drive when the detected irradiance indicates a predetermined decay time.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIGS. 7A to 7C respectively show top, side and edge views of an excitor/detector pair positioned in the drive to detect the latent irradiance marker;

FIGS. 8A to 8D respectively show top, edge, side views, and an electrical schematic of an excitor/detector system suitable for use in the drives;

DESCRIPTION OF EXEMPLARY EMBODIMENTS AND BEST MODE

The present invention relates to a method and system for marking, detecting and identifying certain types of disks that do not have a cartridge or carrier, such as optical disks, for use with a disk drive. Throughout the description, the invention is described in connection with an exemplary data storage disk (hereinafter also referred to as "disk" or "data storage media") and disk drive (hereinafter also referred to as "data storage drive"). It is contemplated that the invention is not limited to the particular data storage disk or disk drive embodiments shown. The invention contemplates the use of other disk types and drive configurations. For example, an optical disk and optical disk drive is described below as part of a laptop or portable computer, yet the present invention could also be used with a mainframe disk drive or backpack and with other types of disks and disk drives such as magnetic, floppy, compact disk, etc. In addition, the following discussion focuses on an embodiment in which only one marker is disposed on one side on a disk. It should be understood that this invention also covers applications which employ multiple markers, such as an embodiment that uses markers that are located on opposite sides of a disk, or multiple markers on one side of a disk. It should be noted that the term "illuminance" as used herein includes, but is not limited to, irradiance and the spectrum of light including ultra-violet (UV), visible, and near infrared.

The present invention relates to a method and system to detect and discriminate the type of cartridgeless data storage disk that has been inserted into a removable data storage drive. The system can be used to determine whether the inserted disk is compatible with the drive, to determine the mode of operation that the drive should be in, and/or to authenticate the contents or source of the data storage disk. The present invention is directed to a cartridgeless disk that comprises a body, a data storage media on the body, and a marker on the body or in the data storage media. The marker comprises a material having a latent irradiance characteristic. The present invention is also directed to an excitation device that is used for illuminating or exciting the marker, and a detection device that is used for sensing the latent irradiance of the marker, identifying the disk, and enabling the drive if the disk is found to be compatible with the drive. Preferably, this invention relates to a method and system of latent irradiance that uses a pre-existing light source in the drive, such as a laser, as the excitation source to illuminate a phosphorous marker on a data storage disk, and uses the existing components of the drive as the detector that senses latent irradiance emitted from the marker to identify the disk for use in the drive.

Figure 1:
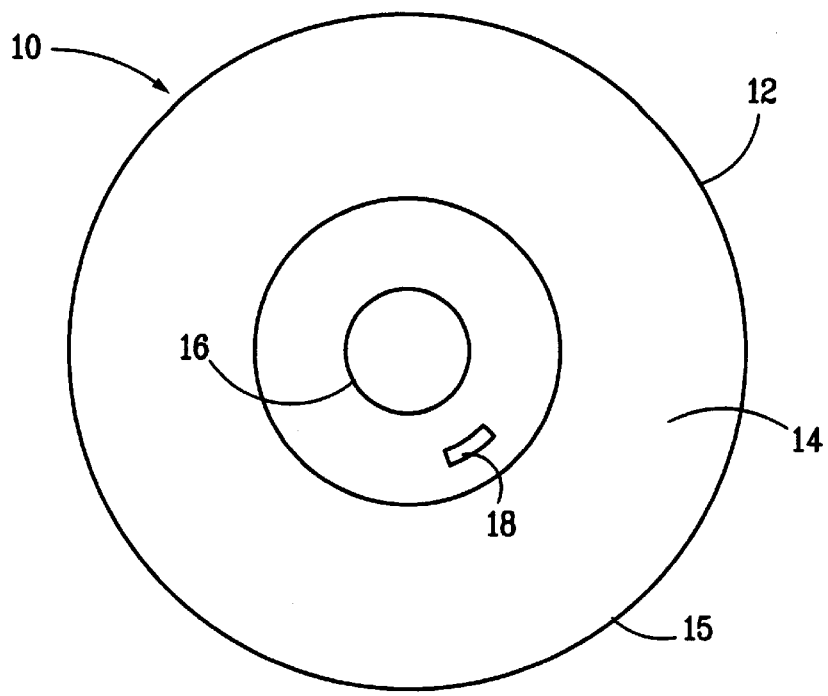
FIG. 1 shows an exemplary data storage disk of the present invention.
Figure 2:
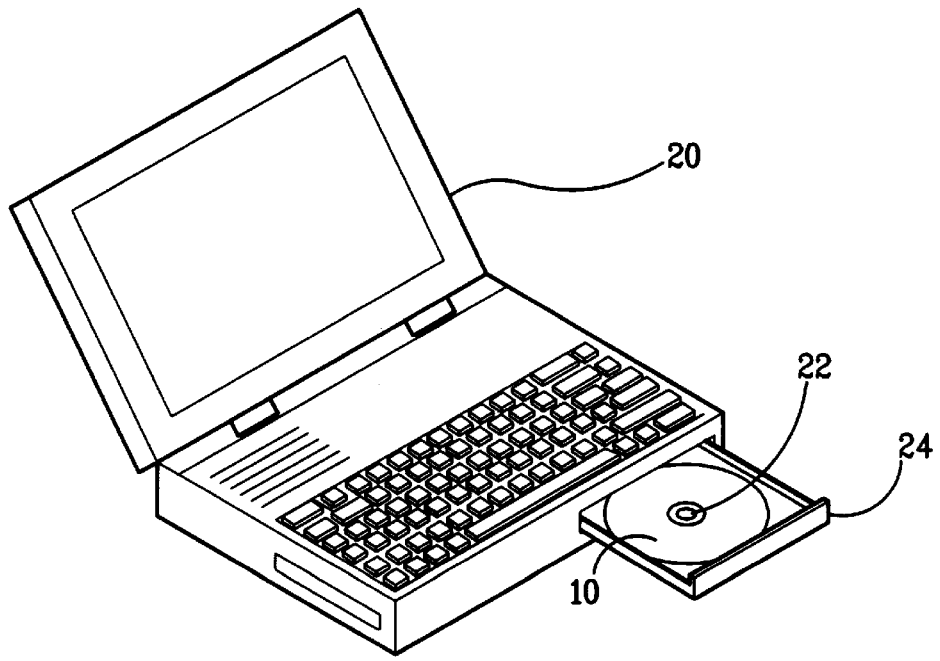
FIG. 2 is a perspective view of one type of device in which the disk of FIG. 1 is used.

FIGS. 1 and 2 show one embodiment of a disk 10 and a disk drive 24 to which the present invention is applicable. FIG. 1 shows a disk 10 comprising a disk-shaped body 12, a data storage media 14 on the body 12, and a central opening 16 in the body for mounting on a hub 22 in a disk drive 24. The disk 10 has no cartridge or carrier and access to the recording surfaces on the data storage media 14 of disk 10 is provided to the recording heads (not shown) of the disk drive 24. In accordance with the present invention, a latent irradiance marker 18 is disposed on disk 10 to be detected by a detector in a disk drive. FIG. 2 shows a laptop computer 20 which has the disk drive 24 for receiving the disk 10 of FIG. 1.

The latent irradiance marker 18 on the disk 10 is desirably very thin in order for the disk 10 to fit in the thin form factor of the drive 24. Although any material exhibiting latent illuminant properties or characteristics can be used in accordance with the present invention, a phosphorescent material is used in a preferred embodiment of this invention. The latent irradiance material in accordance with the invention can comprise either a Stokes phosphor or an anti-Stokes phosphor. A Stokes phosphor is a frequency down converter in which the material is excited with a shorter wavelength or higher frequency light which results in the emission of light of various wavelengths which are longer in wavelength and lower in frequency. An example of a Stokes phosphor is one which is excited with a light of about 660 nm and emits latent irradiance at between about 680 and about 800 nm. An anti-Stokes phosphor is a frequency up converter in which the material is excited with a longer wavelength or lower frequency light which results in the emission of light of various wavelengths which are shorter in wavelength and higher in frequency. Materials of this type are often used for the detection of infrared radiation.

The latent irradiance marker 18, preferably a phosphorescent, can be disposed on the data storage disk 10 or can be formed integral with the disk 10. Any conventional method may be used to dispose the marker 18 on the disk 10, such as a sticker, direct printing onto, or injection molding the marker 18 into the disk 10. For example, on each disk having an authorized copy of a software program or application, a marker, preferably comprising a phosphorescent photoluminent material, serves to identify the type or generation of the disk and distinguish it from other types of disks and purely passive light reflectors.

The marker is preferably disposed on the recording surface of the disk for embodiments which use the read/write optical head for interrogation. In accordance with another embodiment, which uses a separate light source and photodetector for interrogation, the marker is preferably disposed on a portion of the disk that is not accessible by the read/write optical head, such as an inner diameter portion of the disk or the outer edge of the disk. Moreover, a phosphor bar code can be disposed on the edge of a disk in accordance with another embodiment of the present invention.

Figure 3A:
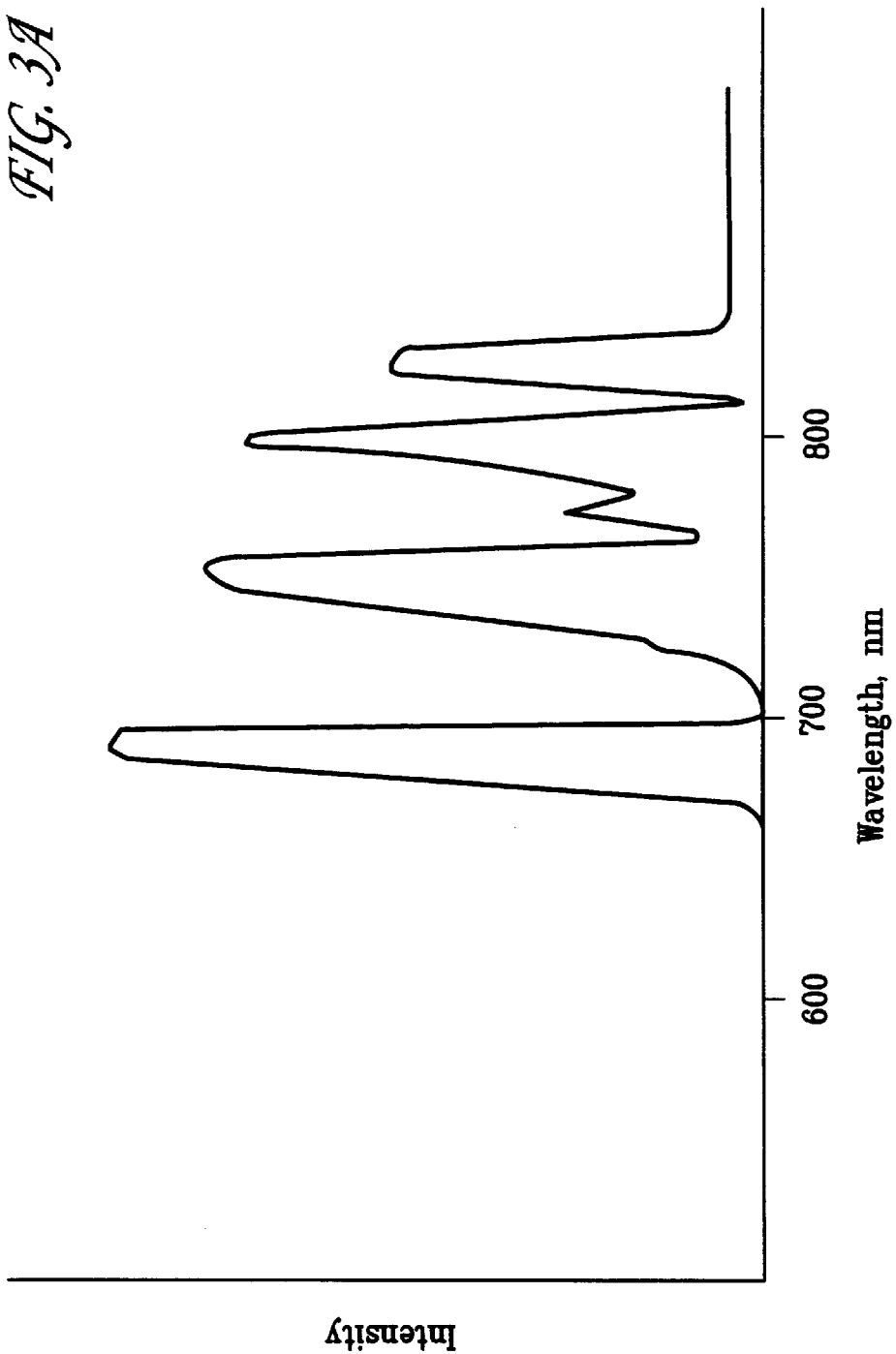
FIG. 3A is an exemplary latent irradiance output spectrum for a marker in accordance with the present invention.

The phosphor type materials used in the phosphorescent marker 18 fluoresce for a period of time after a light source (e.g., shown in FIG. 5 as element 30), preferably a laser, that has illuminated the marker is turned off. The laser excites the marker 18 at an excitation wavelength and the light emitted from the marker 18 has a wavelength (or wavelengths) that is shifted from the excitation wavelength. The wavelength(s) can be shorter or longer than the excitation wavelength. The light emission from the marker 18 is called phosphorescence. An exemplary latent irradiance output spectrum for a marker 18 in accordance with the present invention is shown in FIG. 3A. The output spectrum is characteristic of the material that comprises the marker 18. The intensity of the irradiance or light emitted at at least one of the wavelengths (e.g., about 680 nm) can be monitored to measure a decay time, as described below.

Preferably, the latent illuminance material is excited with light close to a single wavelength that is within an efficient absorption band of the phosphors being used (e.g., about 660 nm). The latent irradiance emitted by the latent illuminance material can be at a single wavelength, or at a spectrum of wavelengths (e.g., between about 680 and about 800 nm). In the latter case, the signal used to determine the decay period (hereinafter also referred to as a decay time or time constant) is measured as the aggregate of the spectrum of wavelengths being detected by the sensor.

Figure 3B:
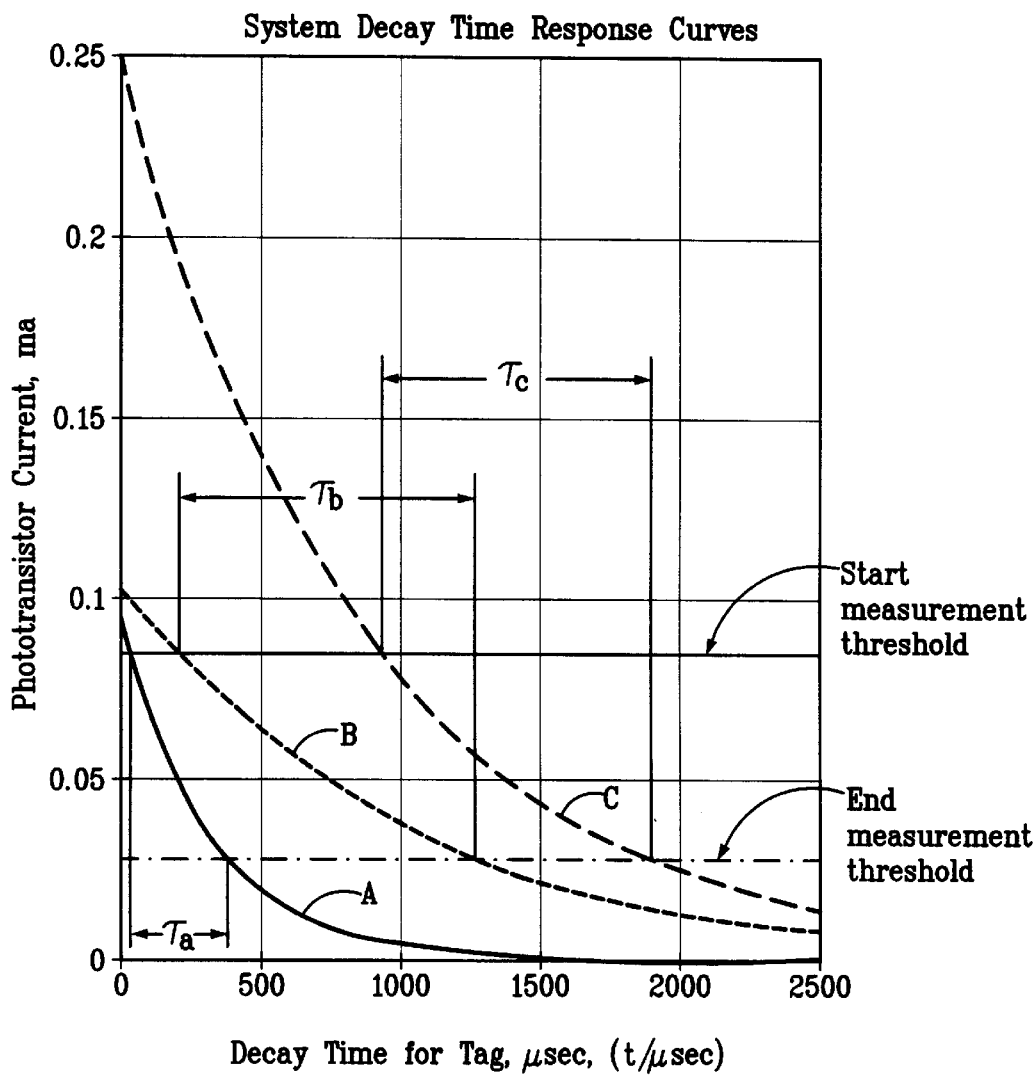
FIG. 3B is a diagram of exemplary decay rates for exemplary marker materials in accordance with the invention.

The marker will emit irradiance or light in accordance with the output spectrum for a period of time after being illuminated with a light source. The decay period for the emitted irradiance ranges from sub-microseconds to several minutes, and preferably between about 50 $\mu$sec and about 3,000 $\mu$sec, depending on the material that is phosphorescing and the wavelength or wavelength spectrum that is being monitored. A decay time constant used to specify marker 20 is the time it takes for the latent irradiance to decay to some fraction, such as 37%, of its initial value. The decay in irradiance takes the form $e^{-t/(T/X)}$ where T is the decay time constant for a predetermined amount of decay, X is a predetermined constant that preferably ranges between about 0.36 and about 2.3, and t is elapsed time from when the charging laser is turned off. For example, for a decay of about 30% of the initial latent irradiance, X is about 0.36. FIG. 3B illustrates this decay for three different exemplary marker materials, A, B, and C, as a graph of phototransistor current versus decay time for the marker. As described below, a detection device having a sensor (e.g., shown in FIG. 5 as element 40), preferably comprising a phototransistor or photodiode, is used to detect the emitted irradiance from the marker.

Figure 3C:
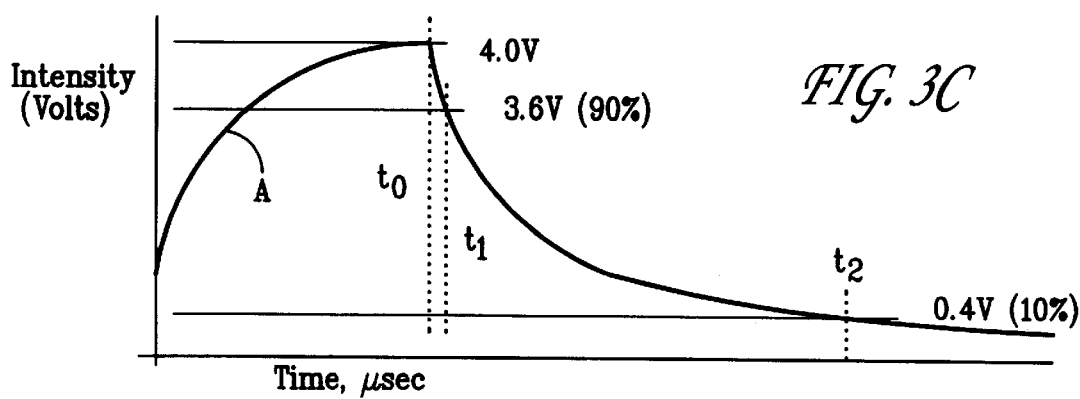
FIG. 3C is an exemplary decay pattern for a marker in accordance with the present invention.

FIG. 3C shows an exemplary decay pattern for a marker in accordance with the present invention. The intensity is measured for a predetermined wavelength. As the marker is being illuminated (charged) by irradiance from a light source, the marker begins to emit latent irradiance, as indicated by line A in FIG. 3C. The light source is turned off at time $t_0$, and the marker thereafter emits latent irradiance from an initial peak value, such as about 4.0 volts, to a low value, ultimately approaching about 0 volts. The decay time is measured between two or more thresholds, such as between 90% and 10% of the initial value; i.e., the time between about 3.6 volts and 0.4 volts, or $t_2-t_1$. This decay from the initial 3.6 volt threshold level to a 0.4 volt threshold level illustrates an embodiment where about an 89% decay time is measured (100*(3.6−0.4)/3.6). The measured decay time is compared with a predetermined decay time to determine whether or not the data storage disk that has been inserted in the disk drive is appropriate for use with the disk drive. If so, the proper mode of operation for the disk is determined and the read/write heads of the disk drive are then able to read the disk. Moreover, the data storage disk can be identified as a particular type or generation, and the disk drive can engage it accordingly.

In a preferred embodiment, the system uses a sampling method which measures the latent irradiance times by rotating the media, and thus the marker, at a predetermined rate, typically between about 500 RPM (about 0.12 sec/revolution) and about 3000 RPM (about 0.02 sec/revolution). The decaying illuminance emitted from the marker is sampled each time the marker comes around the disk for a predetermined number of revolutions of the disk. The marker is illuminated (excited) on the first rotation, and on the second rotation the amplitude (i.e., intensity value) is sampled, using for example, an A/D converter. The amplitude is sampled on each of a subsequent predetermined number of rotations, and responsive to the sampled amplitudes, a decay time or series of decay times is determined; i.e., a decay time is determined as the amount of amplitude decay between two sample times.

Any material or combination of materials exhibiting latent irradiance properties or characteristics can be used as the latent irradiance material in accordance with the present invention, including any phosphor or combination or blend of phosphors. Preferred phosphors include rare earth phosphors including oxides, oxysulfides, silicates, and alumites as well as other photoluminent materials and compounds. There are many possible combinations for photoluminent materials. Most preferably, a phosphor marker for use in accordance with the present invention is manufactured by Sarnoff Corporation, Princeton, N.J. Also, other types of materials having latent characteristics may be used as the marker material such as magnetic materials, or materials with certain vibration or acoustic characteristics.

The marker may be formed separate from or integral with the disk. In one embodiment, the marker is disposed on the disk as a pressure sensitive adhesive (PSA) sticker. The desired phosphorescent material or compound is preferably suspended in an optically clear binder which is coated/printed on the sticker substrate (e.g., white vinyl). PSA with a protective liner is applied to the back side of the sticker substrate. The marker material may alternatively be used as a plastic filler for injection molded parts/markers or blended with inks for printing, or applied via suspension in an adhesive compound such as UV curable epoxy, or using any other suitable method using any other suitable method. Parts requiring identification and discrimination can be either molded, printed onto, or coated with a phosphorescent material or compound.

It is desirable that with ordinary handling and abrasion the marker will not flake, peel or otherwise be damaged in a manner to adversely affect its performance or generate debris which could adversely affect a disk drive's performance. Moreover, preferably, the markers are operational from about −20 to about 65° C. (about −4 to about 149° F.) and have a functional life of at least 15 years. Thus, inorganic phosphors are preferred as the phosphorescent material.

The latent irradiance emitted from the marker is sensed by a detector or sensor, such as a photodetector, in disk drive, to provide for marker type discrimination and desirably the marker has as high a conversion efficiency as possible. In other words, the latent irradiance should have as high a latent irradiance conversion efficiency (LICE) as possible. LICE is the percentage of excitation light hitting the marker that is converted to latent irradiance/light. Moreover, the latent irradiance is preferably irradiated from the marker in a diffuse, spherical manner, equal in all directions.

Figure 4:
FIG. 4 is an enlarged view of an exemplary marker in accordance with the present invention.

The marker can be any size or shape that fits on the disk or in the disk data storage media, with the thickness, or ink thickness if printed, preferably less than about 0.5 mm and a thickness tolerance of about ±0.05 mm. FIG. 4 shows one embodiment of the physical dimensions of the marker implementation for a cartridgeless disk application. The preferred size of the marker if disposed on the recording surface is larger than the spinning disk radial runout, typically about 50 µm. The marker if disposed on the edge of the disk can be any desired dimensions.

The marker 18 may be disposed on disk 10 on at least one side of disk 10 or it may be disposed on both sides of disk 10. The marker 18 may also be disposed on the outer edge 15 of disk 10. The marker 18 may be disposed on disk 10 having numerous shapes and sizes, such as spots or stripes. The marker 18 may be disposed on the body 12 or in the data storage media 14 of disk 10.

In a preferred embodiment, the disk drive has an excitor/detector pair that is used for interrogation of the latent irradiance marker. This excitor/detector pair may be a separate device installed in the drive 24 to perform the function of discriminating a cartridgeless disk with a marker, or preferably, the drive's existing read/write heads are used to perform this function. Using the existing components of the drive 24 provides the advantage of saving space in the drive and of reducing the costs of manufacturing.

Figure 5A:
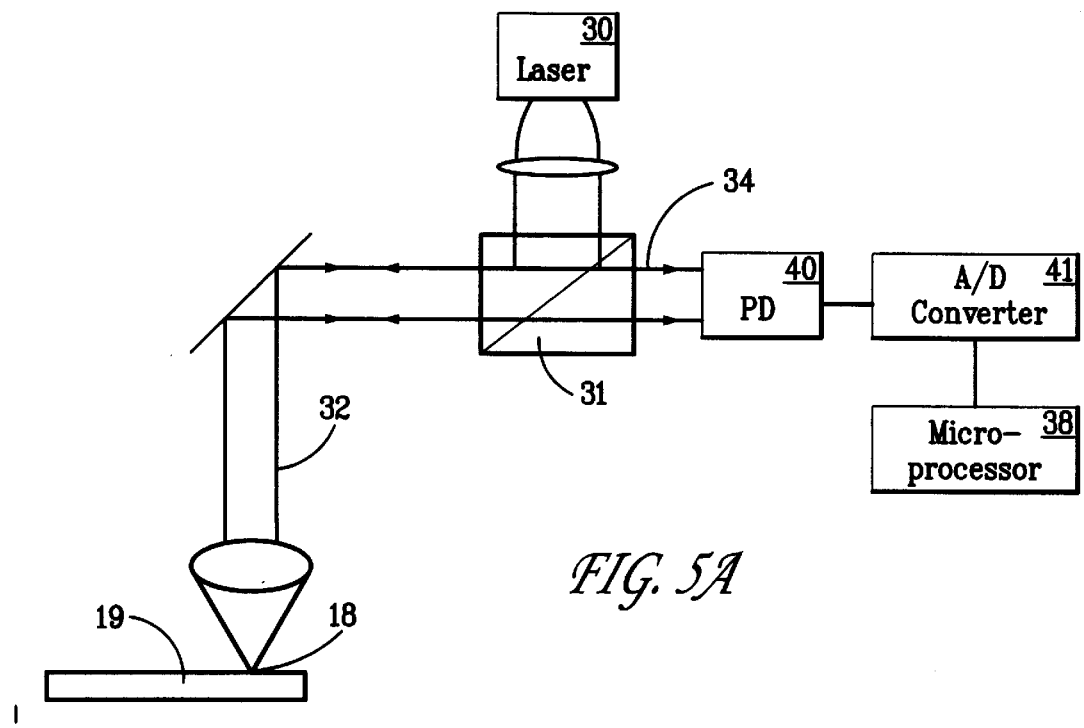
FIG. 5A shows a block diagram of an exemplary system in accordance with the present invention.

FIG. 5A shows a block diagram of an exemplary system in accordance with the present invention. In the embodiment of FIG. 5A, the latent irradiance marker 18 is disposed on the surface of the optical media 19. A light source 30, preferably a laser, irradiates the latent irradiance marker 18 via a beam splitter 31 with a read/write laser beam 32, and is then turned off. The light source 30 is driven by switching and current limiting electronics (not shown), and a microprocessor 38. The marker 18 emits latent irradiance 34, having an initial intensity value at a particular wavelength or wavelengths, which is detected by a sensor or detector 40, such as a phototransistor or photodiode. the photodetector 40 provides the detected signal to an A/D converter 41, which in turn provides the amplitude (intensity value) of the latent irradiance emitted from the marker 18 to the microprocessor 38. The microprocessor 38 measures the timing, determines the decay rate or time constant, and identifies the optical media for validation, as described above.

Figure 5B:
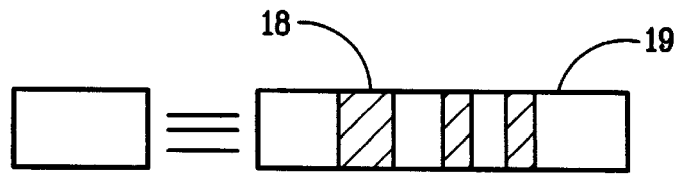
FIGS. 5B and 5C show a side and top view of another exemplary system in accordance with the present invention.
Figure 5C:
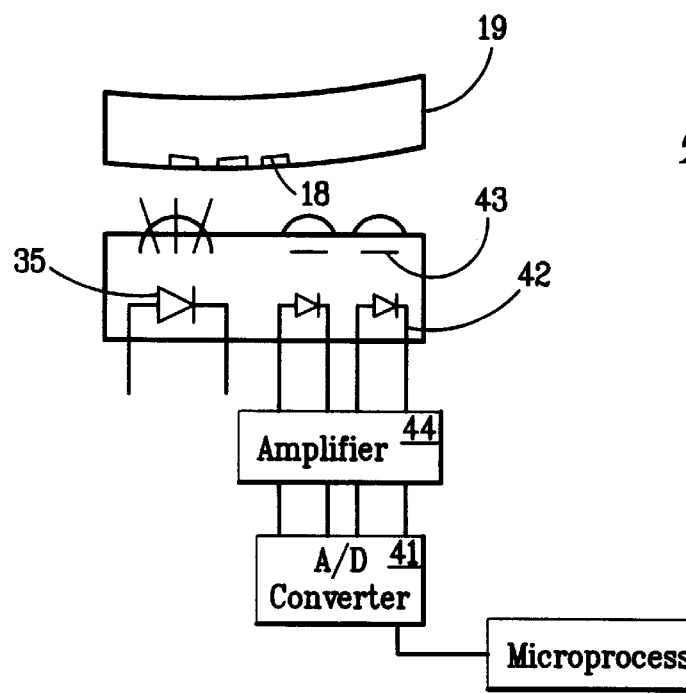

FIGS. 5B and 5C show a side view and a top view, respectively, of another exemplary system in accordance with the present invention. In the embodiment of FIGS. 5B and 5C, the marker 18 is implemented as a bar code on the edge of the optical media 19. A light source 35, such as an LED, irradiates the marker 18 as the optical media is spinning past the light source 35. The light source 35 is then turned off, and the marker 18 emits latent illuminance/irradiance. The latent illuminance is detected at photodiodes 42 (via spectral filters 43), and is amplified, preferably 10X, at an amplifier 44. The amplified signals are sent to the A/D converter 41 and the microprocessor 38 to determine the decay rate or time constant, thereby identifying the optical media for validation. More than one photodiode 42 is shown and used to detect different wavelength bands, as described below with respect to FIGS. 7–9.

Figure 6A:
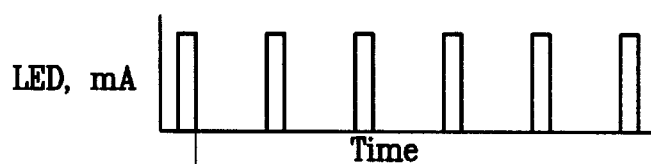
FIGS. 6A and 6B show the time domain operation of an exemplary system in accordance with the present invention.
Figure 6B:
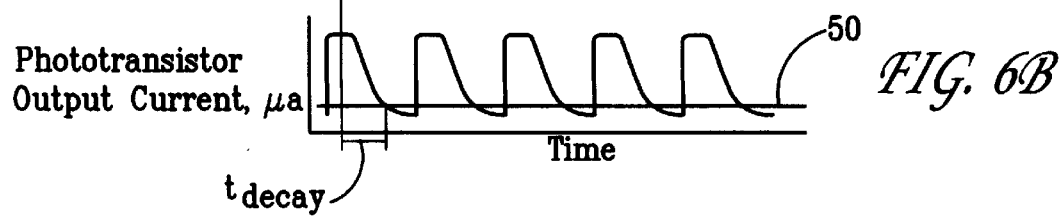

More particularly, when a cartridgeless data storage disk is inserted into a disk drive 24, the light source 30, such as an LED or preferably a laser, emits a short intense pulse of light. The light can be one pulse or a continuous cycle of pulses. Moreover, in another exemplary embodiment, the detection circuitry optically pumps the phosphorescent marker with the light source and measures and compares a phase lag between the drive signal and the decay irradiance. This provides a measure of the decay time constant. FIGS. 6A and 6B show an exemplary laser duty cycle and its corresponding latent irradiance decay profile at a phototransistor output, respectively, for a pulsed laser. The bounded decay time, $t_{decay}$, provides the information that is desirably used to discriminate between a plurality of markers. Line 50 shows the threshold for decay time detection.

The light source 30 should be capable of handling large current surges for short periods to generate bright flashes of light. The outputted light irradiates and excites the latent irradiance marker 18 and thereby excites atoms or ions which emit light and/or photons as they decay to lower energy levels. The phosphor type materials used in the preferred latent irradiance marker 18 fluoresce for a period of time after light source 30 is turned off. The photonic sensor or detector 40 is in close proximity to the light source 30. The detector 40 is initially saturated by the emitted light from marker 18, preferably significantly above the high detection threshold level such that component life and manufacturing tolerances are accommodated (i.e., do not significantly affect the performance of the device). The A/D detection system samples the marker irradiance amplitude level upon each rotation, for a predetermined number of rotations. The decay time is determined by the microprocessor responsive to the sampled amplitudes. The decay time measured by the drive microprocessor provides information by which the drive can determine which generation or type of disk has been inserted.

As described, the excitation device comprises a light source, such as an LED or preferably a laser, and the detector is a photosensor, photodetector, photodiode, or a phototransistor. Preferably, the light source 30 and the detector 40, as well as the associated electronics use the existing components of the disk drive.

A preferred embodiment would work like this. An optical drive goes to the latent irradiance read zone. In this zone there is a reflective timing index on the disk, which is extracted and synced to. Based on this timing index the latent irradiance mark or marks are illuminated/irradiated with the data laser of the drive. The amplitude of the decayed signal or rate (number of spin revolutions required) for the latent irradiance decaying signal to pass through a single or multiple thresholds is measured. During phosphor measurement revolutions of the disk, the optical head is not servo controlled. Due to the hemispherical emission nature of the phosphor, slight drifting of the optical head relative to the disk (runout of disk +/−50–100 microns) has little or no effect on latent irradiance signal amplitude measurements. Based on this information, disk type or copyright validation is extracted. This embodiment is based on the decay time of the latent irradiance material.

FIGS. 7A to 7C show the layout of a suitable excitor/detector pair 50 which includes light source 30 and sensor or detector 40. The marker is illuminated and irradiated with light source 30, and the output of the detector 40 is sampled at regular time intervals to determine the decay signature or time constant for the decay.

The marker 18 can be illuminated with a single color light source 30 or multiple colors (i.e., two or more colors at the same time), depending on the composition of the latent irradiance material compound in the latent irradiance marker 18. For example, in one embodiment, the excitor is a three color light source 30, such as an LED, which illuminates the latent irradiance marker 20 with three colors, for example, red (630 nm), green (560 nm) and orange (605 nm) wavelengths because the marker 18 comprises at least one material, such as phosphor, responsive to one of these wavelengths, and may be a phosphor compound comprising more than one material that is responsive to these wavelengths. The decay signature, or signatures in combination, are used to identify the disk 10 as having a valid latent irradiance marker 18. It should be noted that there are numerous wavelengths of the light source 30 from the blue to the near-IR in the photonic spectrums that are technologically and economically feasible.

The addition of more than one excitor/detector pair allows for emission and detection of multiple wavelengths or colors from the latent irradiance marker, thereby providing cartridgeless type disk discrimination. FIGS. 8A to 8D depict an excitor/detector system 52 which includes two detector devices 40 and two excitation devices or light sources 30. FIG. 8D depicts the electrical components with the legends E for excitor, C for collector, A for anode, and K for cathode. The excitor/detector system 52 includes two detectors having a light detecting sensor or detector 40, such as phototransistors or photodiodes, which are on orthogonal axes in close proximity to two light sources 30, such as a laser or an LED.

Figure 9A:
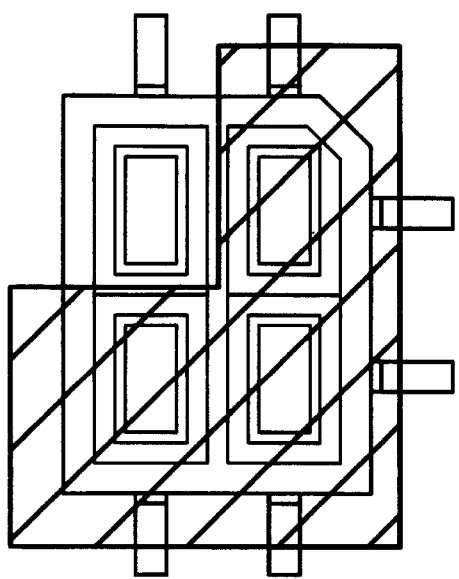
FIGS. 9A to 9D show the discriminatable irradiance states using the excitor/detector system such as that of FIGS. 8A to 8D.
Figure 9B:
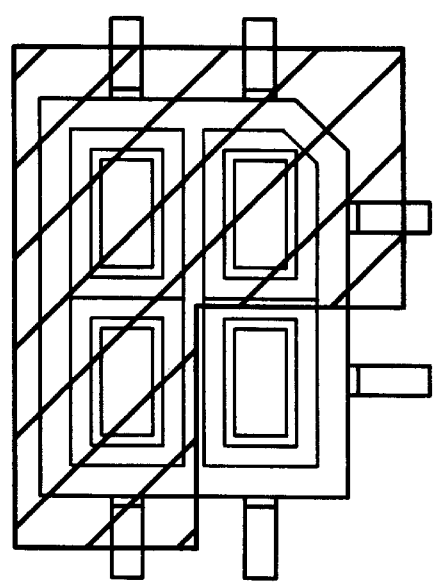
Figure 9C:
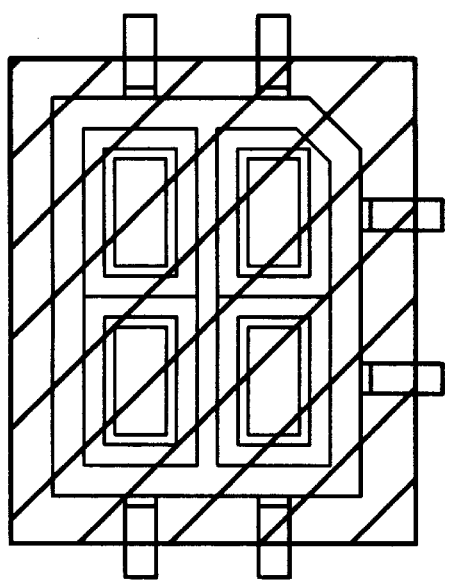
Figure 9D:
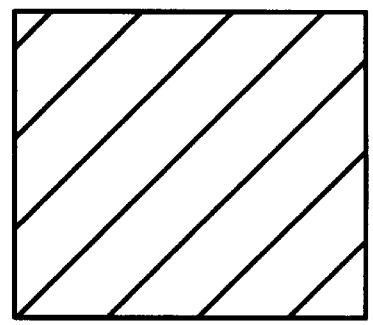

FIGS. 9A to 9D illustrate the three possible detectable or discriminatable states using the two detector systems. It should be noted that the detectors 40 can be oriented in any configuration. State 1 is shown in FIG. 9A, state 2 in FIG. 9B, and state 3 in FIG. 9C. FIG. 9D shows the legend for the excitation devices or light sources 30 and detectors 40 that are active in FIGS. 9A to 9C. An example of the application of this three state system would be in a future higher capacity disk drive. "State 1" would alert to the insertion of an optical disk, "State 2" would alert to the insertion of a DVD disk, and "State 3" would alert to the insertion of a third type of ROM CD.

Addition of a third detector element and a third excitor allows for the detection and discrimination of seven possible states based on material emission wavelength, decay time, or other latent irradiance characteristics. Any number of multiple arrayed detectors and excitors provide an exponentially increasing number of discriminatable states based on material emission wavelength. This number may be increased further by placing markers on both sides of the disk. Alternatively, taking ratiometric measurements between the sensors allows for even more detectable states and improved discrimination.

The excitation wavelength for the latent irradiance marker is preferably a standard laser emitting wavelength.

In addition, the excitation wavelength for the latent irradiance marker may be a standard LED emitting wavelength. Exemplary center wavelengths and their FWHM spectral bandwidths for an LED in order of preference are as follows: 670 nm (30 nm), 605 nm (30 nm), 580 nm (30 nm), and 560 nm (30 nm), such as those manufactured by Sharp and Siemens.

In accordance with the present invention, it is desirable to minimize the spin-up time for the disk drive. The excitation and detection process could occur during motor spin-up which takes about a second; however, due to the high current demands of this process, the available current for marker excitation may be limited. Any light source can be used that puts out light sufficient to energize the latent irradiance marker and can be quickly turned off, such as a laser or an LED.

It is preferred that the existing read/write laser or heads of the drive be used as the excitation/detection system in order to save space and minimize cost. However, any physically compact packages which include both an excitation device having a light source and a detection device having a sensor may be installed into the drive to perform the disk discrimination function. For example, an LED irradiance source and a photodiode or a phototransistor (photonic sensor) such as the Sharp GP2S27 Photointerrupter or the Siemens SFH9101 Light Reflection Switch can be used as excitation/detection apparatus for the present invention. The LED wavelength and window optical potting (spectral filter characteristics) of these devices can be customized for use with the embodiments of the present invention.

In one embodiment, a flood LED (FLED) is used as the light source 30 for irradiating and charging the marker. A preferred commercially available FLED is manufactured by Toshiba and is a very bright 660 nm light source. The FLED is high power and has the ability to charge the latent irradiance marker beyond what could be done with an ordinary LED, such as one found in a commercially available photointerrupter. The FLED prevents the problem of the low signal response from the latent irradiance material and high noise content in the detection circuit.

Preferably, the FLED has a very narrow emission band matching the absorption band of the latent illuminance/irradiance marker.

The FLED also has a narrow beam divergence. This narrowly diverging beam significantly reduces the amount of reflected light from the platform elements on which a cartridge is disposed in a disk drive. The LED source in the photointerrupter is a widely diverging light source. The FLED is a very intense light source. It is configured to send out between about 800 and about 1000 mcd of light to a small area on the tag. The LED source in the photointerrupter is on the order of about 10 to about 15 mcd and spreads light over a much larger area.

A series of different markers (e.g., 10 to 20) can be formulated for a particular user such as a software manufacturer, with each formulation having different latent irradiance materials and therefore different photoluminance decay characteristics or wavelength characteristics. The decomposition and reverse engineering required to reformulate a latent irradiance marker of the present invention is difficult. In the event that such a security break does occur, however, the software manufacturer can switch to another marker having a different signature. These other signatures would be programmed or encrypted into the drive's firmware as a recognizable latent irradiance marker. Thus, the present invention can be used by a software manufacturer to identify its program disks as being authentic, so that only authorized users could use the software stored on those disks. Alternatively, the latent illuminance/irradiance markers' detection alone or in conjunction with the data store on the optical media can act as a key mechanism to allow authorized use of the proprietary software. If the appropriate optical media is not inserted, access to the use of the software is denied.

As stated above, it is most preferred that the latent irradiance wavelength be shifted from that of the emitted source (e.g., the source emits at near-IR wavelengths such as about 760 nm). Secondarily, when using a series of different markers, it is preferred that all the marker types' latent irradiance wavelength spectra be within the responsivity window of silicon (450 nm to 1050 nm) and preferably nearer to the peak response of silicon (950 nm). At a minimum, the latent irradiance wavelength of the marker types preferably are within the response spectrum of silicon (450 nm to 1050 nm).

The time constant for different generations of cartridgeless disks can be produced by using different material compounds which inherently have different latent irradiance decay rates due to their photoreactive chemistry. An appropriate amount is a large enough increase in the time constant such that the system tolerances can be allowed for in the system and do not cause overlap in the time constant discrimination windows for various disk generations. Preferably, the system is dependent on the exponential decay characteristic of the latent irradiance material and does not vary dependent on the gain or frequency response of the system.

In one embodiment of the present invention, at least three phosphorescent compounds with differing latent irradiance decay constants are used to identify three generations of a product. Table 1 specifies the decay time constant for the three exemplary types of markers. The table also provides numerical time values for the detection window for each type of marker. This table is not intended to be an absolute requirement for materials, but rather an example of a workable set of time constants for the exemplary family of three compounds. It is further preferred that 1) the shortest time constant of the family of compounds is at least about 150 $\mu$sec, 2) the longest time constant is less than about 1 sec, 3) the three markers' "system time window of discrimination" (Tmax−Tmin) for the detection system do not overlap, and 4) tolerance on the decay time constant is about +/−5%.

TABLE 1

| Marker No. | "T" Decay time constant ($\mu$sec) | "T" tolerance (±%) | T min ($\mu$sec) | T max ($\mu$sec) | ΔT window ($\mu$sec) |
|---|---|---|---|---|---|
| 1 | 150 | 5 | 120 | 345 | 225 |
| 2 | 500 | 5 | 400 | 1000 | 600 |
| 3 | 1300 | 5 | 1050 | 2400 | 1350 |

A series of phosphorescent compounds is used which produces a latent irradiance after being illuminated by a light source having a visible to near-IR wavelength. This family of compounds preferably has a different decay time constant for the latent irradiance for each of the members of the family. The difference in the decay times is used as a discriminator between a particular member of the family and others and between the particular member and other purely passive light reflectors.

One embodiment in accordance with the present invention incorporates a filter to spectrally filter out the illuminating wavelength at the aperture of the photonic sensor and only transmit the wavelength(s) that are to be emitted by the phosphorescent effect of the marker. This reduces the recovery time required by the photonic sensor to come out of saturation from reflected illuminating wavelengths and makes the system less sensitive to ambient light sources.

In accordance with another aspect of the present invention, in embodiments in which a phototransistor or photodiode is used in the disk drive as a detector, an electronic filter may be placed on the phototransistor or photodiode in the disk drive to filter out lower frequency signals than those desired to be detected as latent irradiance decay.

The phototransistor has a very broad wavelength excitation range which makes it more difficult to detect specific responses. A filter material to remove the visible (short) wavelength light may be placed on the phototransistor. This helps absorb any reflected light that results from a short wavelength source used to charge the latent irradiance material (i.e., the reflected light is the light that is not absorbed and converted into long wavelength light). If the latent irradiance material does not convert light from the visible to the infrared spectrum, the light will be absorbed by the filter, thereby preventing the creation of DC bias in the detection circuitry.

Therefore, the latent irradiance material is charged by light in the visible spectrum. The latent irradiance material emits in the infrared spectrum. The phototransistor filters the reflected "charging light" and detects only the emitted light from the latent irradiance material in the infrared spectrum. Thus, the phototransistor response is improved by minimizing or reducing the excitor load or impedance on the phototransistor, thereby improving the aggregate system response to a short time constant latent irradiance material (i.e., a latent irradiance material having a time constant between about 50 μsec and about 3,000 μsec).

In an alternate embodiment, an absorbing material such as a rare earth element or a dye is disposed within the marker to absorb undesired light at certain wavelength or wavelengths. This is desirable to capture light emitted from the light source that would not otherwise be absorbed by the marker. If not absorbed by the marker, this unwanted light would reflect off the marker and be detected by the detector at a certain wavelength or wavelengths, thereby leading to an incorrect identification of the object. For example, a disk drive may interpret light having a wavelength in the range between 700 nm and 800 nm as belonging to the marker associated with a first type of disk, and may interpret light having a wavelength of 950 nm as belonging to the marker associated with a second type of disk. An absorbing material, such as a rare earth element, can be incorporated into the marker of the first type of disk to absorb light that would not otherwise be absorbed and may reflect at 950 nm to ensure that the drive will not incorrectly identify the first type of disk as being of the second type.

Figure 10:
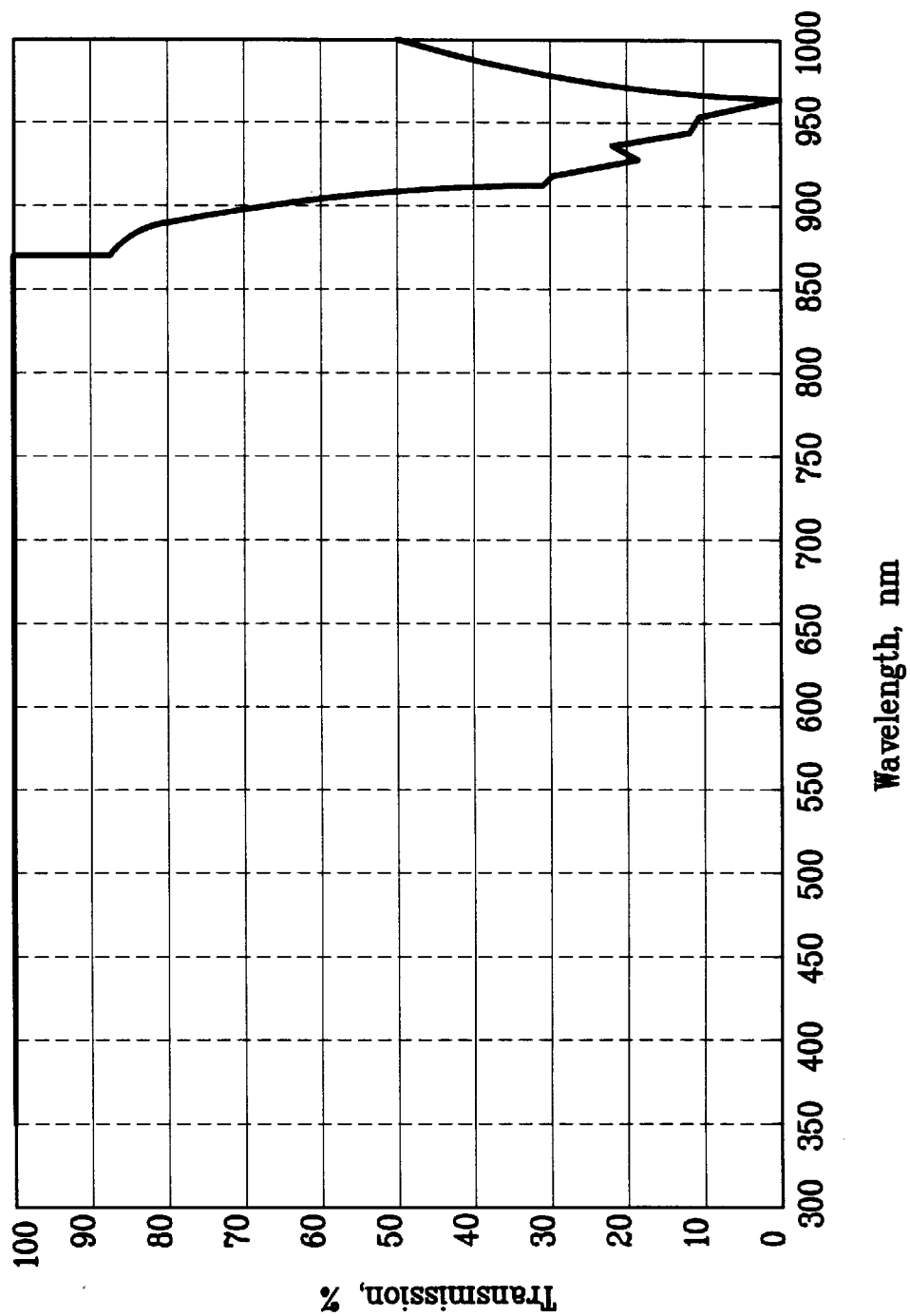
FIG. 10 shows a typical transmission curve for a ytterbium oxide filter for use in the present invention.

A preferred absorbing material for the latent irradiance marker is ytterbium oxide which has a typical transmission curve as shown in FIG. 10 when embodied in 19% ytterbium oxide phosphate glass. Ytterbium is a rare earth metal which absorbs light having a wavelength of about 950 nm. The absorbed light is turned into heat which dissipates. The filter material may be coated onto the marker or blended with the latent irradiance material. The filter absorbs light at a particular wavelength so that false readings are prevented. Furthermore, the filter material, when coated onto the marker, provides increased abrasion resistance for the marker.

Ytterbium has a very narrow absorption band (about 910 to about 990 nm) which is desirable. The phosphor material re-emits light in the about 990 to about 1200 nm range or the 700–910 nm range. If the filter material absorbed light over a very broad range, it would absorb a great deal of the light produced by the phosphor. This would make the disk detection difficult.

Preferably, the filter material is carried in a very matte finish ink binder. Without a tough binder overcoat, the phosphor material could easily be scraped away. The matte finish reduces reflectivity by increasing the light dispersion. The binder for the filter material is also preferably flexible so that the marker does not crack or flake during the assembly process.

In an alternate embodiment in accordance with the present invention, instead of using the decay time or rate of the material in the marker to identify an object, the spectral content or characteristics of the marker are used to identify or authenticate the object that the marker is attached to (i.e., latent wavelength discrimination of the marker is used to identify the object). In other words, the disk drive, instead of measuring or detecting the irradiance and measuring a decay rate or time, detects the spectral content or characteristics of the light emitted from the marker, such as those shown in FIG. 3A. The disk drive then compares the spectral content or characteristics with predetermined or predefined spectral content or characteristics. A match identifies the marker and hence the object it is attached to. Accordingly, any of the markers described in the above embodiments can be used to identify an object using the spectral content or characteristics of the marker instead of the decay rate or time of the marker.

Figure 11:
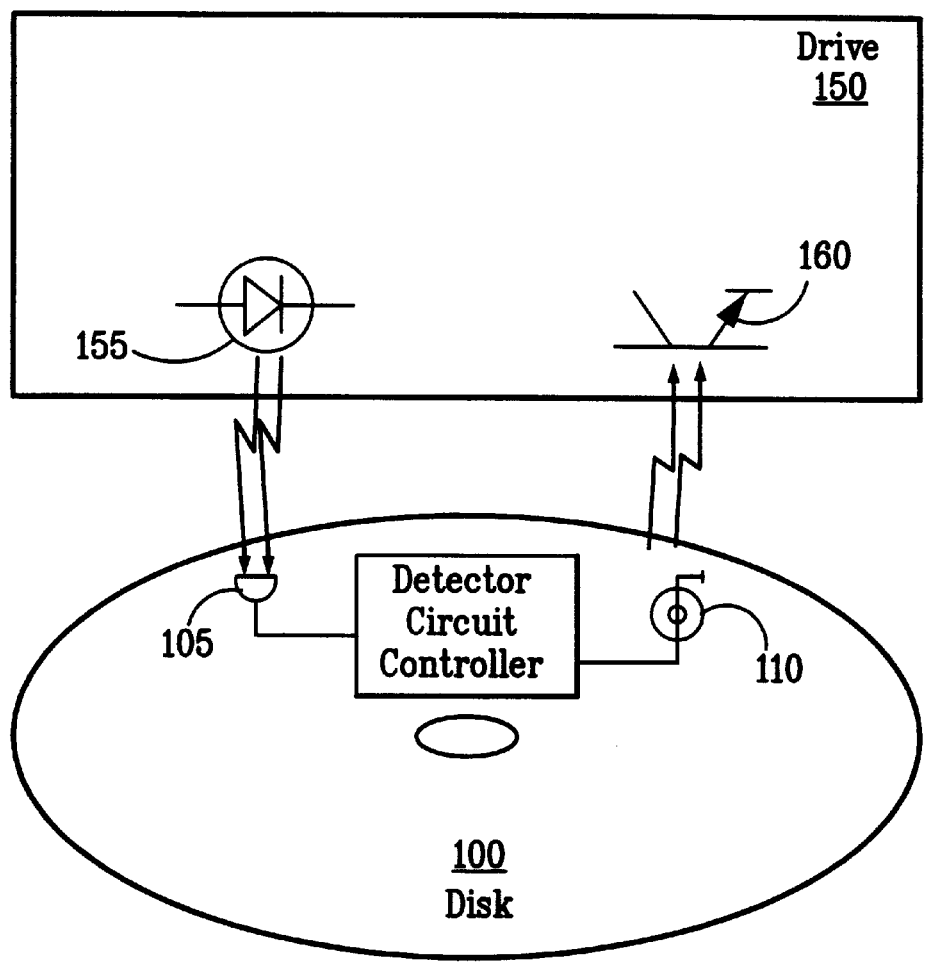
FIG. 11 shows a block diagram of a further exemplary system in accordance with the present invention.

In an alternate embodiment, the action of a latent irradiance marker as described in the above embodiments is simulated by a circuit implemented on a disk as shown in FIG. 11. A photodetector circuit 105 on a disk 100 detects irradiance from a light source 155, such as an LED or laser, on a disk drive 150 and activates a light source 110 such as an LED within the disk 100. The light source 110 emits either a pulse of light set to the detection time constant of the drive detector circuitry 160, or the source 110 outputs an exponentially decaying light that simulates the latent irradiance material used in a latent irradiance marker. In other words, the disk light source 110 flashes at the appropriate time for the appropriate duration at the appropriate amplitude. Or, when triggered by the drive, the disk light source 110 decays from a fixed amplitude to another fixed amplitude over a specific time. Thus, the drive detector circuit 160 will identify the cartridgeless disk to be of the same type as that equipped with the simulated latent irradiance marker and cause the drive to accept the disk. The light detector 105, detector circuit controller 107, and light source 110 can be implemented on a single integrated circuit (IC). The IC could be powered by a battery on the disk 100, by the luminance of the drive 150. It is noted that by appropriate multiple light sources and/or filtering, any and all latent irradiance material configurations described in the above embodiments can be simulated in this manner.

The present invention can be used to identify read only disks, write once disks, and disks having particular applications, such as photodisks for digital camera applications, global positioning or map disks, and book disks.

The markers of the present invention are less complex and more economical to manufacture than other types of markers. The markers are highly repeatable and thus provide a manufacturing advantage.

Although the present invention has been described herein with respect to cartridgeless disk detection, it can be used in any object detection or discrimination apparatus or application, such as anti-counterfeiting apparatus and applications.

Another embodiment of this invention uses signal decaying magnetic materials as the marker on magnetic disks. Many ferromagnetic materials lose their magnetism at different rates. This characteristic may be measured by the magnetic drive. Also, the coercivity of the disk may be used as an indicator of disk type. One embodiment would require that the media on the disk be written in one state/pole direction with full saturation current. Incrementally, the state of magnetization would be reversed with the amplitude of the written signal being read for each pass. A more simple and cost effective implementation would be to saturate write the signal and then incrementally switch the signal until it is no longer decodable. This level will be different for each drive, but would be stored with the drive at time of manufacture to make drive implementation feasible. In a magnetic drive, this technique can also provide a measure of the head to disk interface (HD) degradation in the field and allow corrective action prior to data reliability in the drive causing catastrophic data lose problems.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A cartridgeless data storage disk for a data storage drive which has a source of irradiance at an irradiance wavelength and a detector of irradiance for determining whether the data storage disk is suitable for use in said drive, comprising:
   a body;
   a data storage media on said body; and
   a marker disposed on said body, said marker comprising a latent irradiance material which receives irradiance from said source and emits irradiance having an initial intensity value toward said detector for detection, which thereby identifies said data storage disk as being suitable for use in that drive, such that detection of said marker by said detector of said drive enables operation of said drive, wherein said latent irradiance material has a decay time which is used to identify said data storage disk.

2. The data storage disk of claim 1, wherein said body comprises one of a read only memory (ROM), compact disk (CD), a read/write (R/W) CD, a write once CD, an optical data storage device, a video data storage device, an audio data storage device, and a digital versatile disk data storage device.

3. The data storage disk of claim 1, wherein said marker has a latent irradiance wavelength spectrum in the range between about 450 nm and about 1050 nm.

4. The data storage disk of claim 3, wherein said marker has a latent irradiance wavelength spectrum in the range between about 680 nm and about 800 nm.

5. The data storage disk of claim 3, wherein said irradiance wavelength is outside of said latent irradiance wavelength spectrum.

6. The data storage disk of claim 1, wherein said latent irradiance material comprises a phosphorescent material.

7. The data storage disk of claim 6, wherein said phosphorescent material comprises a rare earth phosphor.

8. The data storage disk of claim 6, wherein said phosphorescent material comprises a Stokes phosphor.

9. The storage disk of claim 1, wherein said decay time is in the range between about 50 $\mu$sec and about 3,000 $\mu$sec.

10. The data storage disk of claim 1, wherein said decay time is an amount of time for said irradiance from said marker to decay from a first predetermined intensity value to a second predetermined intensity value.

11. The data storage disk of claim 1, wherein said irradiance from said marker has an intensity that decays exponentially.

12. The data storage disk of claim 1, wherein said marker further comprises a filter to absorb light having a predetermined range of wavelengths.

13. The data storage disk of claim 12, wherein said filter comprises a rare earth element.

14. The data storage disk of claim 13, where said rare earth element is ytterbium.

15. A cartridgeless data storage disk for a data storage drive which has a source of irradiance at an irradiance wavelength and a detector of irradiance for determining whether the data storage disk is suitable for use in said drive, comprising:
   a body;
   a data storage medium on said body; and
   a marker on said body, said marker comprising a material which receives irradiance from said source at said irradiance wavelength and emits irradiance at an emission wavelength different from said irradiance wavelength toward said detector for detection which thereby identifies said data storage disk as being suitable for use in that drive such that detection of said marker by said detector of said drive enables operation of said drive, wherein said latent irradiance material has a decay time which is used to identify said data storage disk.

16. The data storage disk of claim 15, wherein said emission wavelength is greater than said irradiance wavelength.

17. The data storage disk of claim 16, wherein said material comprises a latent irradiance material.

18. The data storage disk of claim 17, wherein said latent irradiance material comprises a phosphorescent material.

19. A cartridgeless data storage disk drive comprising:
   a source of irradiance;
   a detector of irradiance; and
   means for enabling operation of said drive, said detector being connected to enable said means for enabling operation of said drive when said detected irradiance indicates a predetermined decay time.

20. The cartridgeless data storage disk drive of claim 19, wherein said source of irradiance is a laser.

21. The cartridgeless data storage disk drive of claim 20, wherein said laser is a read/write laser.

22. The cartridgeless data storage disk drive of claim 19, wherein said detector comprises one of a photodiode, a phototransistor, a photosensor, a light receptor, a photodetector.

23. The cartridgeless data storage disk drive of claim 19, wherein said drive further comprises monitoring means for monitoring the output of said detector and determining a decay time of said detected irradiance, said detector connected to enable said drive when said decay time substantially equals said predetermined decay time.

24. The cartridgeless data storage disk drive of claim 23, wherein said monitoring means comprises a microprocessor.

25. The cartridgeless data storage disk drive of claim 19, further comprising a filter for filtering irradiance of at least one predetermined wavelength from entering said detector.

26. A cartridgeless data storage disk drive comprising:
   a source of irradiance;
   a detector of irradiance; and
   means for enabling operation of said drive, said cartridgeless data storage disk drive adapted to receive a cartridgeless data storage disk comprising:
      a body;
      a data storage media on said body; and
      a marker on said body, said marker being a latent irradiance material which receives irradiance from said source and emits irradiance toward said detector for detection, said detector being connected to enable said means for enabling operation of said drive when said detected irradiance indicates a predetermined decay time.

27. The cartridgeless data storage disk drive of claim 26, wherein said source of irradiance is a laser.

28. The cartridgeless data storage disk drive of claim 27, wherein said laser is a read/write laser.

29. The cartridgeless data storage disk drive of claim 26, wherein said detector comprises one of a photodiode, a phototransistor, a photosensor, a light receptor, a photodetector.

30. The cartridgeless data storage disk drive of claim 26, wherein said drive further comprises monitoring means for monitoring the output of said detector and determining a decay time of said detected irradiance, said detector connected to enable said drive when said decay time substantially equals said predetermined decay time.

31. The cartridgeless data storage disk drive of claim 30, wherein said monitoring means comprises a microprocessor.

32. The cartridgeless data storage disk drive of claim 26, further comprising a filter for filtering irradiance of at least one predetermined wavelength from entering said detector.

33. The cartridgeless data storage disk drive of claim 26, further comprising:
- a plurality of sources of irradiance to emit irradiance at a first plurality of wavelengths; and
- a plurality of detectors of irradiance to detect irradiance at a second plurality of wavelengths, whereby detection of particular ones of said second plurality of wavelengths identifies a type of cartridgeless data storage disk.

34. The combination of a cartridgeless data storage disk drive and an cartridgeless disk for said drive, said drive comprising:
- a source of irradiance at an irradiance wavelength;
- a detector of irradiance; and
- means for enabling operation of said drive, said cartridgeless disk comprising:
  - a body;
  - a data storage medium on said body; and
  - a marker on said body, said marker being a latent irradiance material which receives irradiance from said source and emits irradiance toward said detector for detection,
  - wherein said detector is connected to enable said means for enabling operation of said drive when said detected irradiance indicates a predetermined decay time.

35. The combination of claim 34, wherein said source of irradiance is a laser.

36. The combination of claim 35, wherein said laser is a read/write laser.

37. The combination of claim 34, wherein said detector comprises one of a photodiode, a phototransistor, a photosensor, a light receptor, a photodetector.

38. The combination of claim 34, wherein said drive further comprises monitoring means for monitoring the output of said detector and determining a decay time of said detected irradiance, said detector connected to enable said drive when said decay time substantially equals said predetermined decay time.

39. The combination of claim 34, further comprising a filter for filtering irradiance of at least one predetermined wavelength from entering said detector.

40. The combination of claim 34, wherein said marker is an indicator of whether said cartridgeless disk is correct and compatible for use in said drive.

41. The combination of claim 34, further comprising:
- a plurality of sources of irradiance to emit irradiance at a first plurality of wavelengths; and
- a plurality of detectors of irradiance to detect irradiance at a second plurality of wavelengths, whereby detection of particular ones of said second plurality of wavelengths identifies a type of cartridgeless disk.

42. The combination of claim 34, wherein said marker has a latent irradiance wavelength spectrum in the range between about 450 nm and about 1050 nm.

43. The combination of claim 42, wherein said marker has a latent irradiance wavelength spectrum in the range between about 680 nm and about 800 nm.

44. The combination of claim 42, wherein said irradiance wavelength is outside of said latent irradiance wavelength spectrum.

45. The combination of claim 34, wherein said latent irradiance material comprises a phosphorescent material.

46. The combination of claim 45, wherein said phosphorescent material comprises a rare earth phosphor.

47. The combination of claim 45, wherein said phosphorescent material comprises a Stokes phosphor.

48. The combination of claim 34, wherein said latent irradiance material has a decay time which is used to identify said cartridgeless disk.

49. The combination of claim 48, wherein said decay time is in the range between about 50 $\mu$sec and about 3,000 $\mu$sec.

50. The combination of claim 48, wherein said decay time is an amount of time for said irradiance emitted from said marker to decay to a predetermined intensity value.

51. The combination of claim 48, wherein said decay time is an amount of time for said irradiance emitted from said marker to decay from a first intensity value to a second intensity value.

52. The combination of claim 34, wherein said irradiance emitted from said marker has an intensity that decays exponentially.

53. The combination of claim 34, wherein said marker further comprises a filter to absorb light having a predetermined range of wavelengths.

54. The combination of claim 53, wherein said filter comprises a rare earth element.

* * * * *